United States Patent
Kim et al.

(10) Patent No.: US 7,755,999 B2
(45) Date of Patent: Jul. 13, 2010

(54) OPTICAL DISC DRIVING APPARATUS AND LAND PRE-PIT DETECTION METHOD USING THE SAME

(75) Inventors: Beung Chan Kim, Yongin-Si (KR); Jae Hyeon Woo, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1128 days.

(21) Appl. No.: 11/401,224

(22) Filed: Apr. 11, 2006

(65) Prior Publication Data

US 2006/0182003 A1    Aug. 17, 2006

(30) Foreign Application Priority Data

Aug. 22, 2005    (KR)    .................. 10-2005-0076937

(51) Int. Cl.
 *G11B 7/00*    (2006.01)
(52) U.S. Cl. .................. 369/124.07; 369/124.12; 369/124.15
(58) Field of Classification Search .............. 369/44.29, 369/44.35, 44.36, 124.1–124.12, 112.15, 369/44.25, 44.26
See application file for complete search history.

(56) References Cited

U.S. PATENT DOCUMENTS

| | | | | |
|---|---|---|---|---|
| 2002/0114248 A1* | 8/2002 | Kato et al. | ............... | 369/59.17 |
| 2002/0167888 A1* | 11/2002 | Kamioka et al. | ........ | 369/124.12 |
| 2004/0066724 A1* | 4/2004 | Hsu | ........ | 369/59.15 |
| 2004/0071057 A1 | 4/2004 | Ohta et al. | | |
| 2004/0136284 A1* | 7/2004 | Sano et al. | ............... | 369/47.17 |
| 2005/0002304 A1 | 1/2005 | Lo et al. | | |

(Continued)

FOREIGN PATENT DOCUMENTS

CN    1645486    7/2005

(Continued)

OTHER PUBLICATIONS

European Search Report issued Dec. 11, 2006 by the European Patent Office re: European Application No. 06007221.2-2223 (6 pp).

*Primary Examiner*—Thang V Tran
(74) *Attorney, Agent, or Firm*—Stanzione & Kim, LLP

(57) ABSTRACT

An optical disc driving apparatus and a land pre-pit detection method are provided for defining determination factors which have an effect on land pre-pit signal detection efficiency. The optical disc driving apparatus comprises an RF processing unit for forming a push-pull signal from an electrical signal acquired through an optical disc; and a control unit for arranging a representative value of determination factors for forming the push-pull signal and testing an error with respect to a land pre-pit (LPP) signal detected from the push-pull signal. As a result, the optical disc driving apparatus is capable of decreasing time for determining the optimal balance level and slice level, and applying the optimal balance level and slice level to the optical disc driving apparatus which operates in real time by defining representative values of each zone according to size of a balance level and a slice level. The optical disc driving apparatus is also capable of increasing performance of land pre-pit detection, by defining representative values of each zone according to a balance level, a slice level and a gain of a wobble signal and by using representative values of each zone when performing real-time test.

28 Claims, 15 Drawing Sheets

U.S. PATENT DOCUMENTS

2005/0047759 A1* 3/2005 Sakata .................. 386/125
2005/0117503 A1* 6/2005 Yanagawa et al. ...... 369/124.12

FOREIGN PATENT DOCUMENTS

| EP | 1 184 850 | 3/2002 |
| EP | 1 227 484 | 7/2002 |
| EP | 1 229 533 | 8/2002 |
| EP | 1 465 166 | 10/2004 |
| WO | WO 2005/055211 | 6/2005 |

* cited by examiner

FIG.5

| Zone Number (Zi) | Representative Value of Zone (B , S) |
|---|---|
| 1 | (1 , 1) |
| 2 | (1 , 3) |
| 3 | (1 , 5) |
| ⋮ | ⋮ |
| 13 | (5 , 5) |
| ⋮ | ⋮ |
| 25 | (9 , 9) |

FIG. 13

| Zone Number (Zi) | Representative Value of Zone (B, S, G) |
|---|---|
| 1 | (1, 1, 0) |
| 2 | (1, 3, 0) |
| ⋮ | ⋮ |
| 125 | (9, 9, 9) |

OPTICAL DISC DRIVING APPARATUS AND LAND PRE-PIT DETECTION METHOD USING THE SAME

CROSS-REFERENCE TO RELATED APPLICATION

This application claims all benefits accruing under 35 U.S.C. §119 from Korean Patent Application No. 2005-76937, filed on Aug. 22, 2005, in the Korean Intellectual Property Office, the disclosure of which is incorporated by reference herein.

BACKGROUND OF THE INVENTION

1. Field of the Invention

The present invention relates to an optical disc driving apparatus, and more particularly, relates to an optical disc driving apparatus for defining determination factors which have an effect on land pre-pit signal detection efficiency, and a land pre-pit detection method using the same.

2. Related Art

In general, when an optical disc, such as a digital versatile disc (DVD)-R and DVD-RW, is manufactured, a land pre-pit (LPP) is formed on a land to represent location information of the optical disc. The land pre-pit contains address information to identify any location on an unrecorded disc.

A general optical disc driving apparatus is then employed to detect the land pre-pit formed on the optical disc to acquire the address information, and to perform a variety of control operations with respect to recording or reproducing of the optical disc on the basis of the land pre-pit information.

FIG. 1 illustrates a typical push-pull signal into which a wobble signal, a land pre-pit signal and a noise signal are mixed. The push-pull signal which corresponds to reflected-light information through the optical disc, is obtained from the optical disc by the optical disc driving apparatus in order to acquire the land pre-pit information. Referring to FIG. 1, the push-pull signal is formed based on a composite of a wobble signal, a land pre-pit signal and a noise signal. Typically, a balance level (B) and a slice level (S) of the push-pull signal serve as major determination factors of the land pre-pit signal.

When the land pre-pit information is to be detected, a fixed balance level and slice level are applied considering a location and shape of the land pre-pit according to the optical disc manufacturer. However, a land pre-pit error may occur. The land pre-pit error is an error in which noise components can be misjudged as the land pre-pit actually pitted on an optical disc, particularly when the noise components occur during the detection of the land pre-pit.

In addition, when a pre-pit mark is formed on a groove track which is close to a land in which a pre-pit is pitted, the balance level and the slice level need to be adaptively defined in consideration of physical conditions of the optical disc in order to prepare for the case where a power voltage for forming the pre-pit mark exceeds a proper power voltage, or where the number of re-recording operations exceeds a predefined limit.

According to conventional error test techniques, all of the balance levels and slice levels of the optical disc need to be individually tested in order to determine an adequate balance level and slice level.

FIG. 2 is a flowchart of a conventional error test method for individually defining a balance level and a slice level of an optical disc. Referring to FIG. 2, a balance level (B) and a slice level (S) are set to respective initial values (Bi, Si) at block #1. Next, whether a land pre-pit error occurs is determined by comparing a land pre-pit decoding address with a reference value at block #2. Accordingly, in the case where the land pre-pit is not adequately detected, that is, the case where the land pre-pit error occurs, the balance level (B) is first rearranged in a predetermined order at block #3, and then the slice level (S) is rearranged on the basis of the rearranged balance level at block #4. After the rearranged balance level and slice level are applied, whether an error with respect to the land pre-pit signal occurs is determined at block #5. If the error occurs, whether the slice level (S) is below the last value (n) in a predetermined order is determined at block #6. If the slice level (S) is below the last value (n), the slice level (S) on the basis of the rearranged balance level (B) is continuously rearranged within a range of the last value (n) in order to test the error. If the error continuously occurs during this test, whether the above arranged balance level (B) is below the last value (m) is determined at block #7. If the balance level (B) is below the last value (m), the balance level (B) is secondly rearranged in a predetermined order at block #3. Subsequently, the slice level (S) on the basis of the secondly rearranged balance level (B) is continuously rearranged in order to test the error. This error test is continuously performed within a range of the last value (m) of the balance level (B).

On the other hand, if the error continuously occurs even when the balance level (B) and the slice level (S) are respectively rearranged within the range of the last values (n, m), the error occurrence due to physical damage of the optical disc or the like is confirmed at block #8.

However, the above-mentioned error test method is applied to the optical disc with respect to all applicable balance levels and slice levels. As a result, the error test can require a significant amount of time to complete the testing as a range of the balance level and slice level increases. Therefore, it is difficult to apply the conventional error test method to an optical disc driving apparatus which is operated in real-time.

SUMMARY OF THE INVENTION

Various aspects and example embodiments of the present invention provide an optical disc driving apparatus, and a land pre-pit detection method in which an optimal balance level and slice level can be quickly ascertained by defining representative values of each zone according to size of a balance level and a slice level, and the optimal balance level and slice level can be applied to the optical disc driving apparatus in real time. Additionally, representative values of each zone according to a balance level, a slice level and a gain of a wobble signal can also be utilized during real-time testing, in order to increase the performance of detecting a land pre-pit.

Additional aspects and/or advantages of the invention will be set forth in part in the description which follows and, in part, will be obvious from the description, or may be learned by practice of the invention.

In accordance with an aspect of the present invention, an optical disc driving apparatus is provided with an RF processing unit arranged to form a push-pull signal from an electrical signal acquired through an optical disc; and a control unit configured to arrange a representative value of determination factors for forming the push-pull signal, and testing an error with respect to a land pre-pit (LPP) signal detected from the push-pull signal.

The control unit may rearrange the representative value of the determination factors for forming the push-pull signal, when an error test result satisfies a predetermined error condition.

The control unit may determine whether the predetermined error condition is satisfied on the basis of an error probability acquired by the error test within a predetermined range.

The RF processing unit may form the push-pull signal on the basis of the representative value of the determination factors which is rearranged.

A zone table may be included for storing a plurality of representative values corresponding to a plurality of zones which are respectively partitioned depending on a size of the determination factors. The control unit may acquire the representative value of the determination factors from the zone table.

The zone table in which a plurality of zones may be uniformly formed has the same sized determination factors.

The zone table includes at least two of the determination factors, and the zone table in which a plurality of zones are formed has at least one of the determination factors and other determination factors with respective different sizes.

The zone table in which a plurality of zones are formed has partly different zone density within the entire zone range.

The determination factors may include a balance level and a slice level. The determination factors may further include a gain of a wobble signal.

In accordance with another aspect of the present invention, there is provided a land pre-pit (LPP) detection method comprising: forming a push-pull signal from an electrical signal acquired through an optical disc; detecting a land pre-pit signal from the push-pull signal; testing an error with respect to the land pre-pit signal; defining a representative value of determination factors for forming the push-pull signal when an error test result does not satisfy a predetermined error condition; and testing an error with respect to the land pre-pit signal detected from the push-pull signal which is formed on the basis of the defined representative value of the determination factors.

The defining of the representative value of the determination factors may be reiterated a predetermined number of times in order to satisfy the error condition.

The defining of the representative value of the determination factors may be acquired in predetermined order from a zone table in which a plurality of zones are stored The defining of the representative value of the determination factors may be performed according to at least one of a balance level and a slice level.

The defining of the representative value of the determination factors may be performed according to at least one of a balance level, a slice level and a gain of a wobble signal.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 5 illustrates an example table in which representative values of zones correspond to zone number which is respectively classified to the zones shown in FIG. 4;

FIG. 13 illustrates an example table in which representative zone values correspond to zone number which is respectively classified to the zones shown in FIG. 12.

DETAILED DESCRIPTION OF THE EMBODIMENTS

Figure 1:
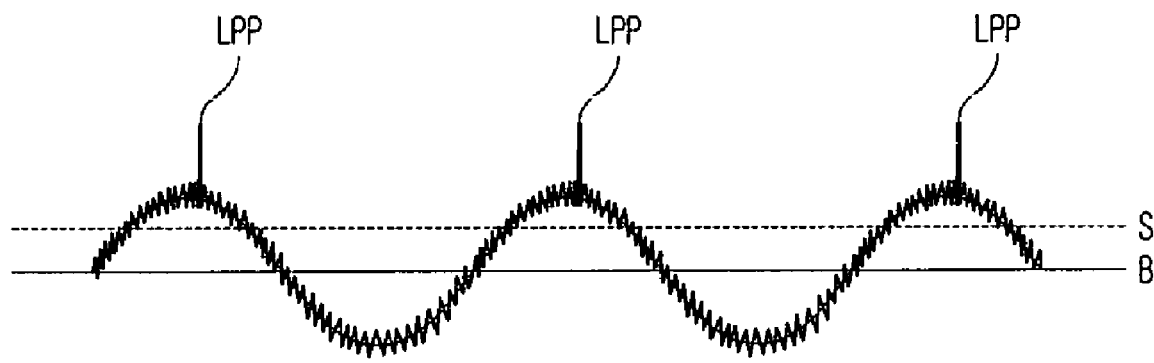
FIG. 1 is a view showing a push-pull signal into which a wobble signal, a land pre-pit signal, and a noise signal are mixed.
Figure 2:
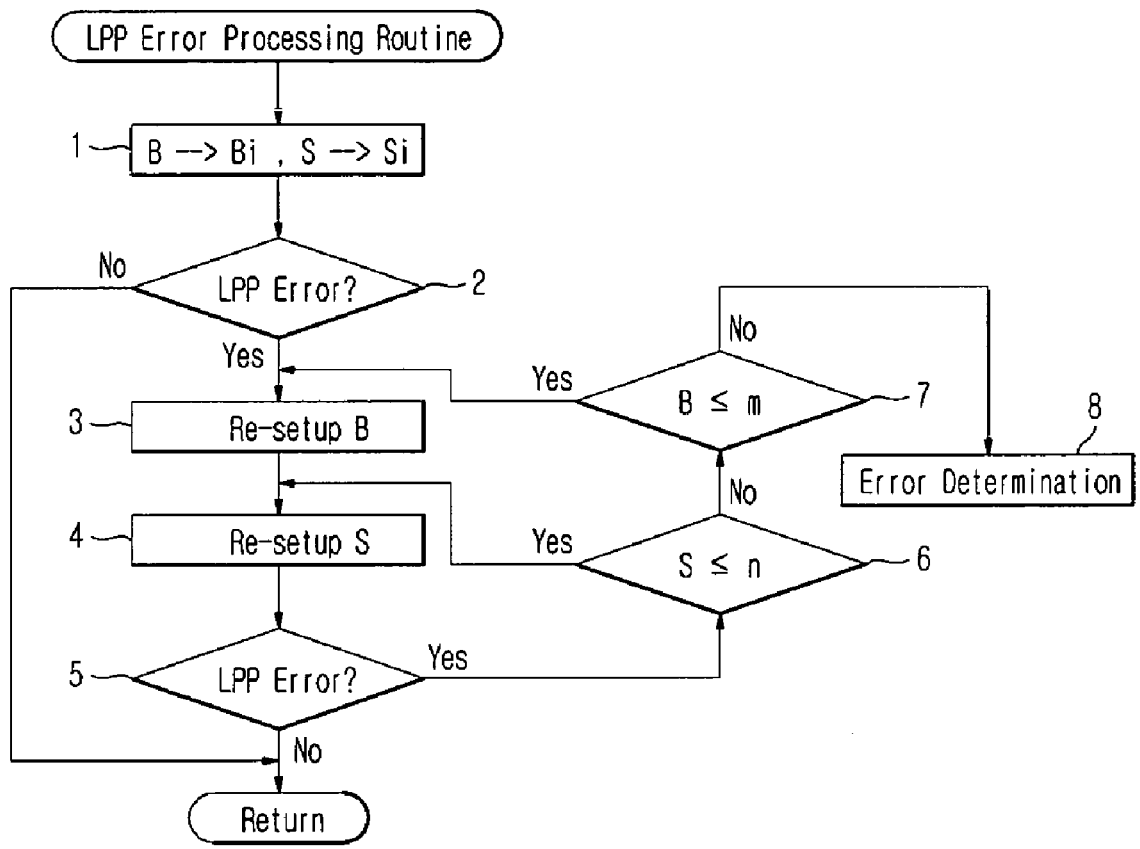
FIG. 2 is a flowchart of a typical error test method for individually arranging a balance level and a slice level of an optical disc.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
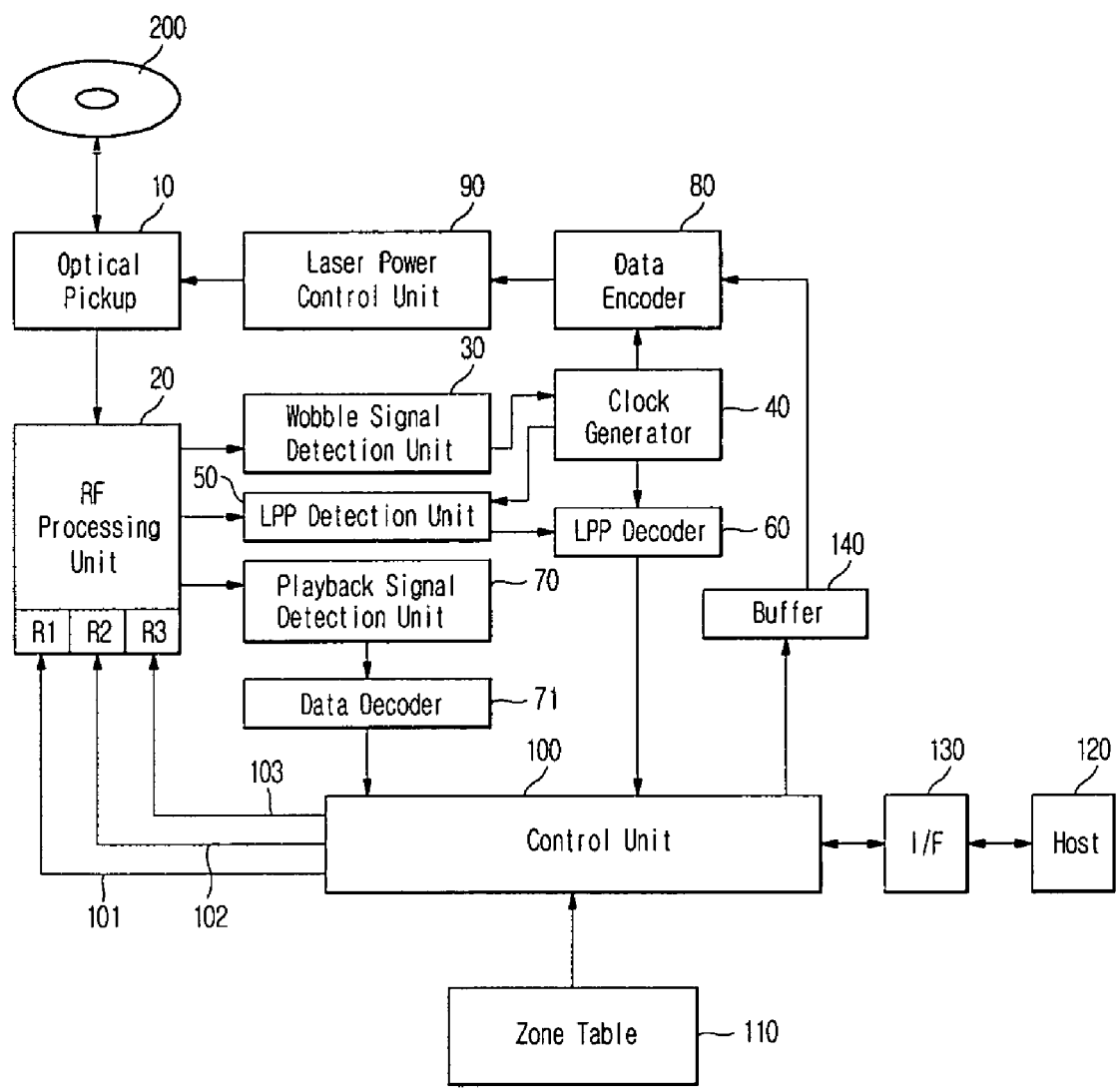
FIG. 3 is a block diagram of an example optical disc driving apparatus according to an embodiment of the present invention.

FIG. 3 is a block diagram showing the configuration of an optical disc driving apparatus according to an embodiment of the present invention. As shown in FIG. 3, the optical disc driving apparatus according to the present invention includes an optical pickup 10, an RF processing unit 20, a wobble signal detection unit 30, a clock generator 40, a land pre-pit (LPP) detection unit 50, an LPP decoder 60, a playback signal detection unit 70, a data decoder 71, a data encoder 80, a laser power control unit 90, a control unit 100, a zone table 110, an interface (I/F) 130 provided to interface with a host 120, and a buffer 140 provided between the data encoder 80 and the control unit 100.

The optical pickup 10 reproduces pit mark data, wobbling information of the track and land pre-pit information of an optical disc 200, wherein the pit mark data are recorded in a groove track on an optical disc such as DVD-R and DVD-RW.

The optical pickup 10 includes a laser diode for use as a source of laser light, an optical detector for detecting a reflected light, and an optical system for irradiating the laser light on a recording surface of the optical disc and guiding the reflected light to the optical detector.

The laser diode of the optical pickup 10 is activated depending on an output signal of the laser power control unit 90.

The reflected light reflected from the optical disc 200 is detected by the optical detector included in the optical pickup 10, and is converted into an electrical signal according to the amount of the reflected light. The resulting electrical signal is provided to a matrix circuit of the RF processing unit 20.

The RF processing unit 20 outputs an operational amplified signal through the matrix circuit thereof. The outputted operational amplified signal includes an RF signal corresponding to data reproduced through the optical disc 200, a land pre-pit signal, and a push-pull signal with respect to wobbling of the groove. The push-pull signal is formed on the basis of initial values of the first to the third registers R1, R2 and R3 set in the RF processing unit 20, that is, a balance level, a slice level and a gain of a wobble signal as respective determination factors.

The wobble signal detection unit 30 detects the wobble signal from the push-pull signal of the RF processing unit 20, and provides the wobble signal to the clock generator 40.

The clock generator 40 supplies, during a recording operation, a recording clock to the data encoder 80 and an operating clock to the LPP detection unit 50 and the LPP decoder 60, respectively.

The LPP detection unit 50 detects the land pre-pit signal from the push-pull signal and supplies the same to the LPP decoder 60, according to the operating clock. The LPP decoder 60 decodes an address based on the land pre-pit signal from the LPP detection unit 50 and supplies the same to the control unit 100.

The playback signal detection unit 70 converts the RF signal into a 2-level signal in a binary form and supplies the converted signal to the data decoder 71, which in turn decodes the supplied signal and supplies the decoded result to the control unit 100.

The control unit 100 receives commands for recording and reproducing operations through a host 120, via an interface (I/F) 130. When performing the recording operation, recording data inputted from the host 120 is stored in the buffer 140, via the interface (I/F) 130.

The data encoder 80 encodes the recording data stored in the buffer 140 according to the recording clock, and outputs the encoded recording data to the laser power control unit 90. The laser power control unit 90 converts the encoded recording data into a recording pulse, and provides the recording pulse to the optical pickup 10. Thus, a laser beam corresponding to the recording pulse is radiated through the lased diode included in the optical pickup 10, and the recording operation is performed on the optical disc 200.

The control unit 100 confirms whether the land pre-pit signal is appropriate on the basis of the address decoded by the LPP decoder 60, and determines an error for the land pre-pit signal if the land pre-pit signal is not appropriate.

When testing the error for the land pre-pit signal, the control unit 100 outputs the first and second arranging signals 101, 102 to the first and second registers (R1, R2) of the RF processing unit 20 in order to rearrange the balance level and the slice level as the determination factors of the land pre-pit signal. Herein, the control unit 100 controls a rearrangement operation of the balance level and the slice level depending on the pre-stored information in the zone table 110. The method for controlling the rearrangement operation will be described herein below.

Figure 4:
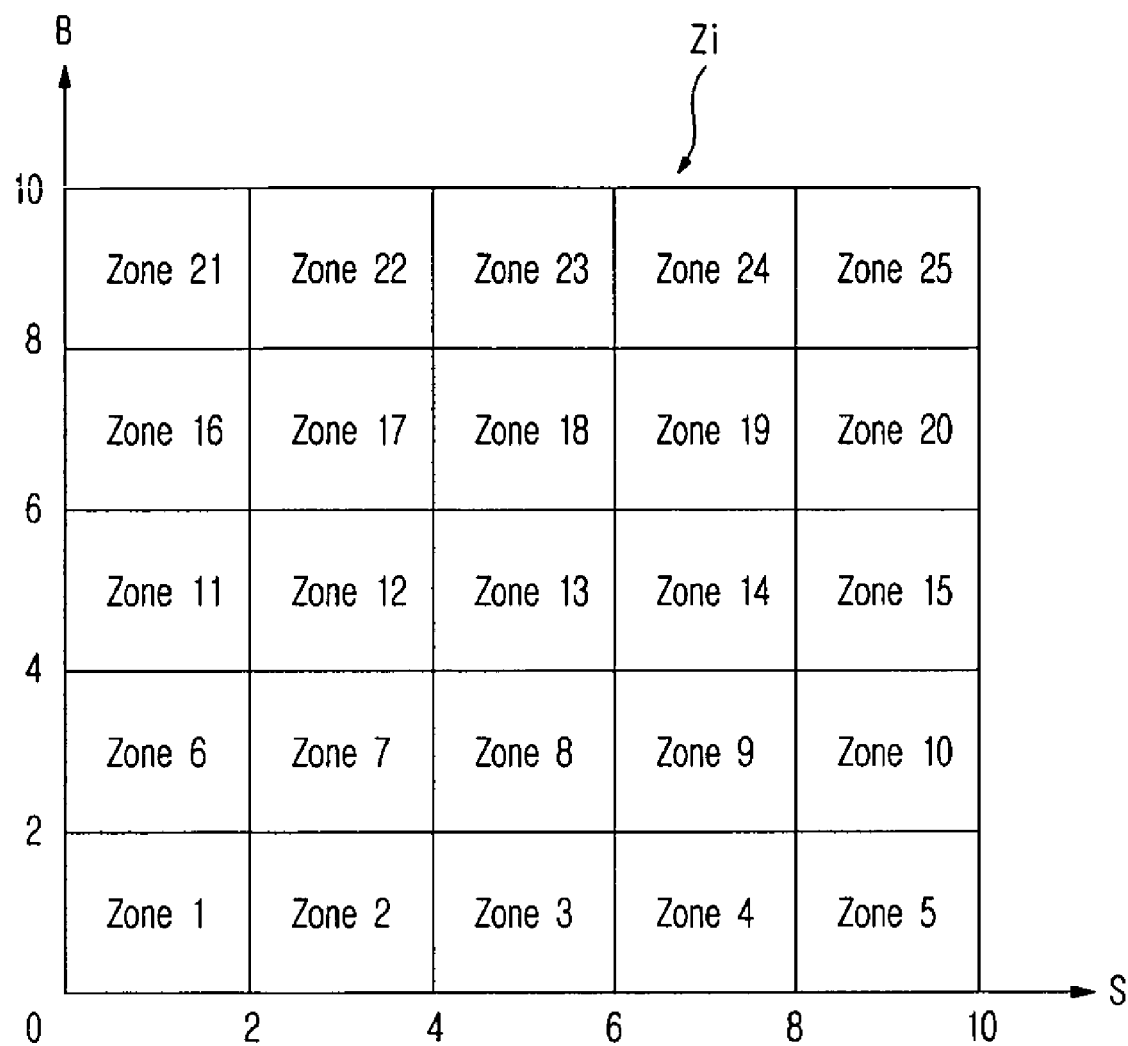
FIG. 4 illustrates an example zone table in which zones are equally formed according to an embodiment of the present invention.

FIG. 4 is a view illustrating an example zone table 110 in which zones are equally formed according to an embodiment of the present invention. As shown in FIG. 4, the zone table 110 is partitioned into plural zones (Zi) having a uniform size in the entire balance level and the slice level area. The zones (Zi) are numbered in series, and arrange a representative value among values constituting the numbered zones (Zone 1~Zone 25).

FIG. 5 is a view illustrating an example table in which representative values of zones correspond to a zone number which is respectively classified to the zones shown in FIG. 4. As shown in FIG. 5, a zone representative value (B, S) in response to the zone number (Zi) is composed of the balance level and the slice level, and makes a pair.

Figure 6:
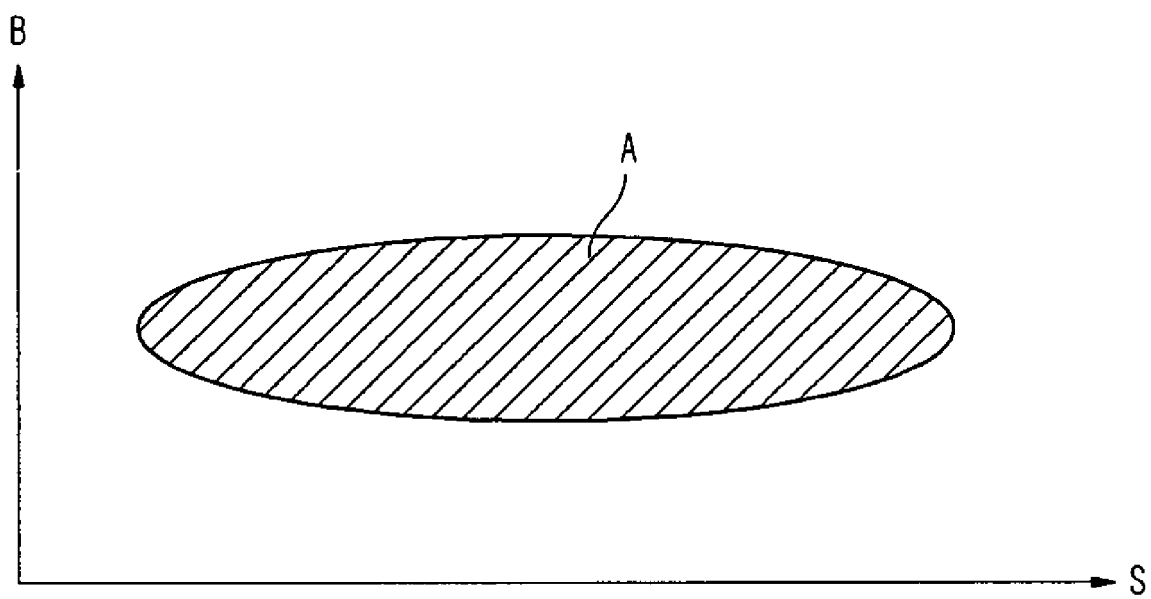
FIG. 6 illustrates an example representing a range of a balance level and a slice level in which a land pre-pit error probability satisfies a predetermined condition according to an embodiment of the present invention.

FIG. 6 illustrates an example representing a range of a balance level and a slice level in which a land pre-pit error probability satisfies a predetermined condition. There is a range where an error probability occurs relatively low depending on the size of the balance level and the slice level. For example, the error probability which satisfies a specific condition (5~10%) within a predetermined range (A) as shown in FIG. 6 can be acquired.

Figure 7:
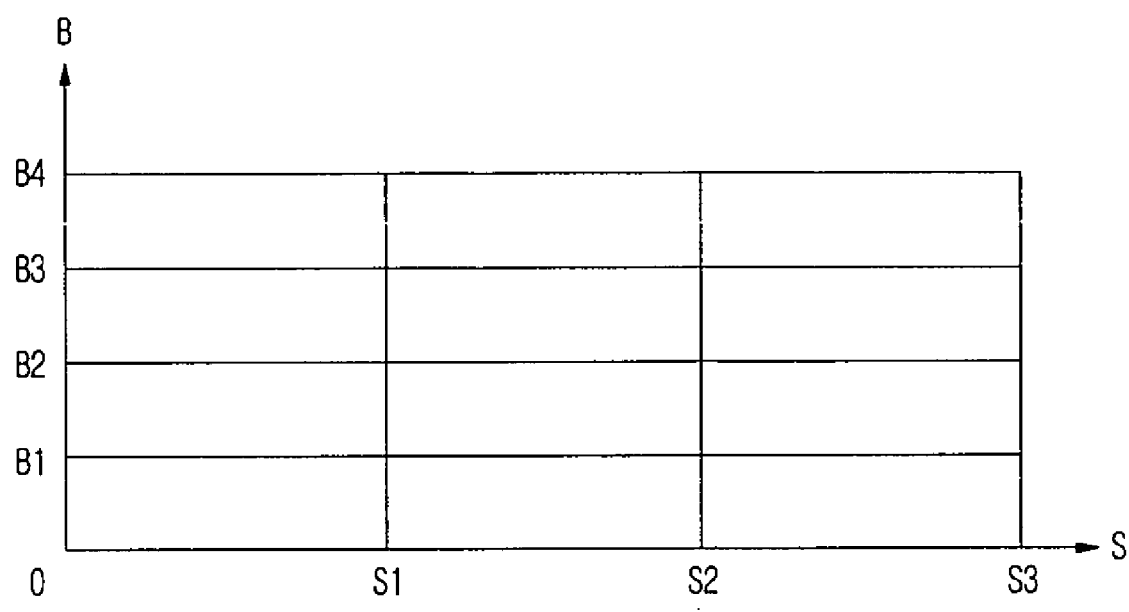
FIG. 7 illustrates an example zone table in which zones each have a different balance level size and slice level size according to another embodiment of the present invention.

FIG. 7 is a view illustrating an example zone table 110 in which zones each have a different balance level size and slice level size according to another embodiment of the present invention. In the case where all of the zones (Zi) in the zone table 110 are uniformly arranged as shown in FIG. 4, the balance level size (B1, B2, B3, B4) of the zone (Zi) is relatively small and the slice level size (S1, S2, S3) of the zone (Zi) is relatively large as shown in FIG. 7.

Figure 8:
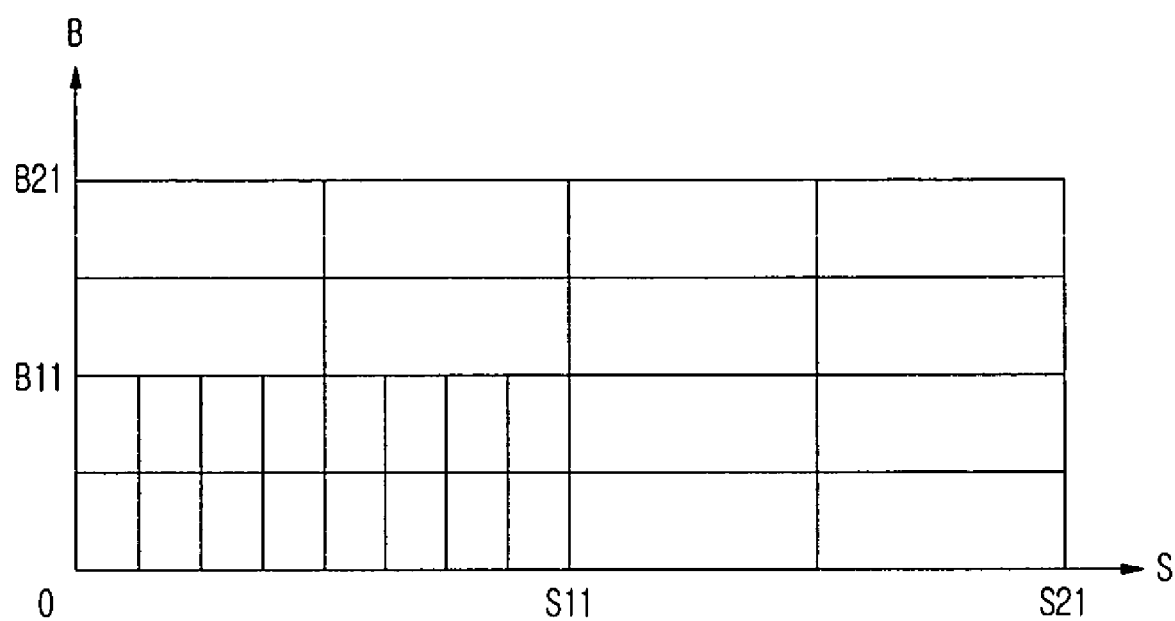
FIG. 8 illustrates an example zone table in which zones having different densities are mixed according to yet another embodiment of the present invention.

FIG. 8 is a view illustrating an example zone table 110 in which zones having different densities are mixed according to yet another embodiment of the present invention. As shown in FIG. 8, the zones having different densities in the zone table 110 are mixed. For example, a zone density in the area constituting low balance levels (0~B11) among the entirety of balance levels (0~B21) and low slice levels (0~S11) among the entirety of slice levels (0~S21) in the zone table 110 is high, and zone densities in the other areas are low.

The zone table 110 can be variously composed. Particularly, the zone size can be arranged with regard to characteristics of the optical pickup 10, and an error probability acquired by experimentation can be considered.

Meanwhile, when the error test is performed by individually applying the representative value of the zone with respect to the plurality of zones constituting the zone table 110, a test range for the recording data area of the optical disc needs to be adequately arranged in order to ensure reliability of the test.

Figure 9:
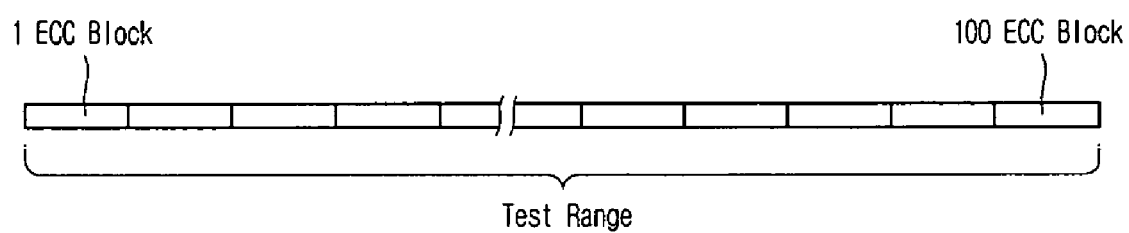
FIG. 9 illustrates an example representing a test range with respect to recording area of an optical disc for testing error conditions of a land pre-pit according to an embodiment of the present invention.

FIG. 9 illustrates an example representing a test range with respect to recording area of an optical disc for testing error conditions of a land pre-pit according to an embodiment of the present invention. As shown in FIG. 9, the error test is performed in the entirety of 100 ECC blocks per a unit. The error test is defined such that an error condition is detected if the resulting error probability is within a specific range (5~10%).

On the other hand, the error test method using the representative value according to various embodiments of the present invention will be described as follows.

Figure 10:
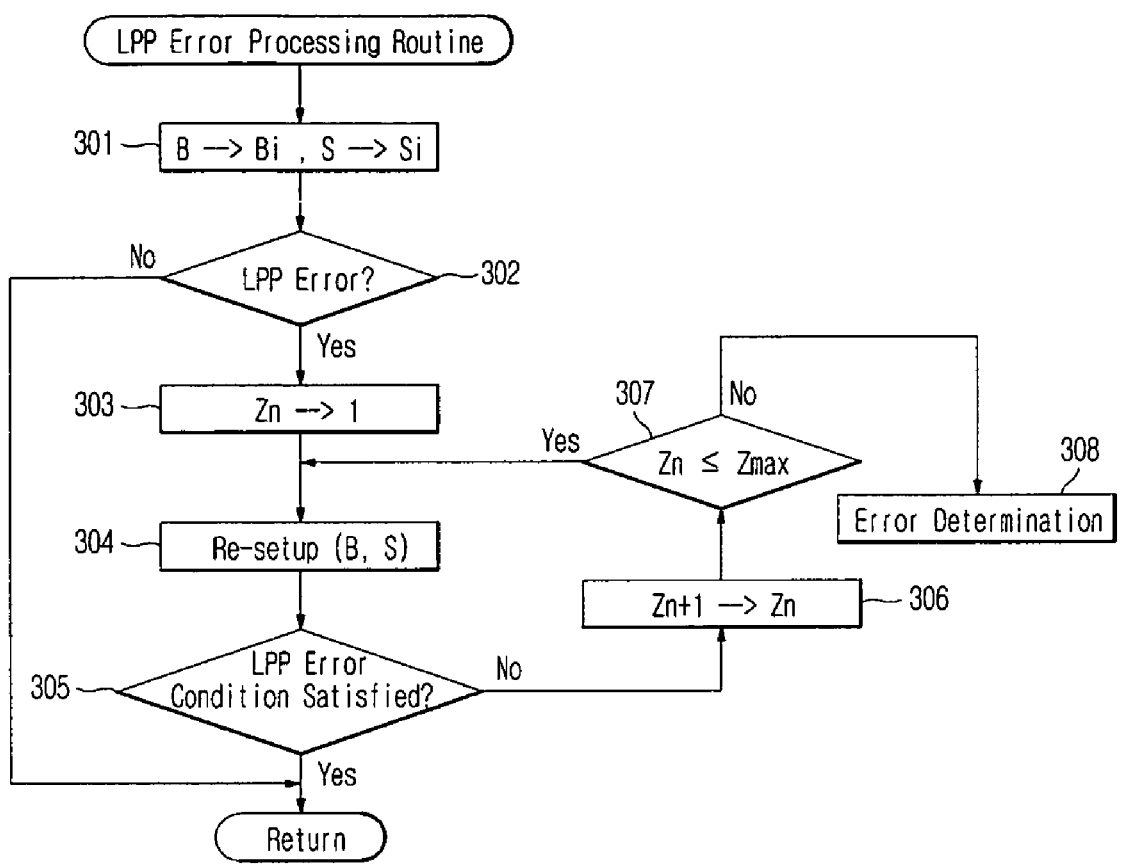
FIG. 10 is a flowchart of an error test method in which representative values of zones are used according to an embodiment of the present invention.

FIG. 10 is a flowchart illustrating an error test method in which representative values of zones are used according to an embodiment of the present invention. Referring to FIG. 10, a balance level (B) and a slice level (S) are set to respective initial values (Bi, Si) at block 301. Next, whether a land pre-pit error occurs is determined by comparing a land pre-pit decoding address with a reference value at block 302. Accordingly, in the case where the land pre-pit is not adequately detected, that is, the land pre-pit error occurs, zone number (Zn) is arranged to 1 at block 301, and a representative value (B, S) in response to the first zone (Z1), that is, a pair of the balance level and slice level is rearranged to (1, 1) at block 304.

The error test is performed by applying the balance level and the slice level (1, 1) which are rearranged according to the representative value of the first zone, and whether the test result satisfies an error condition is determined at block 305. Herein, the test range is set to the entire 100 ECC blocks, as shown, for example, in FIG. 9, and an error probability is calculate in response to a sum of errors generated in each block. If the calculated error probability is within a specific range (5~10%), it is considered that the calculated error probability satisfies the error condition.

If the resulting calculated error probability satisfies the error condition, the zone number (Zn) is incremented by 1 at block 306. Next, whether the incremented zone number (Z2) is below the last zone number (Zmax) is determined at block 307. If the zone number (Z2) is below the last zone number (Zmax), the process returns to block 304 and the balance level and the slice level (1, 3) are rearranged on the basis of the representative value in response to the second zone (Z2). Subsequently, the error test is performed by applying the rearranged balance level and slice level, and whether the test result satisfies an error condition is determined at block 305.

In this error test, the balance level and the slice level according to a representative value of any zone, for example, the thirteenth zone (Z13) may be set to (5, 5). If the resulting error provability satisfies the specific condition (5~10%), the representative value of the thirteenth zone (Z13) can be applied. Accordingly, the land pre-pit signal can be stably detected, and then a recording or reproducing operation of the optical disc can be accurately performed.

In addition, if the error probability does not satisfy the error condition even when the error test is performed with respect to the balance level and the slice level rearranged according to representative values of all zones, it is confirmed that the error has occurred due to physical damage of the optical disc or the like at block 308.

Meanwhile, in the detection of the land pre-pit signal, a gain of a wobble signal as well as the above balance level and slice level has an effect on the land pre-pit signal.

Figure 11A:
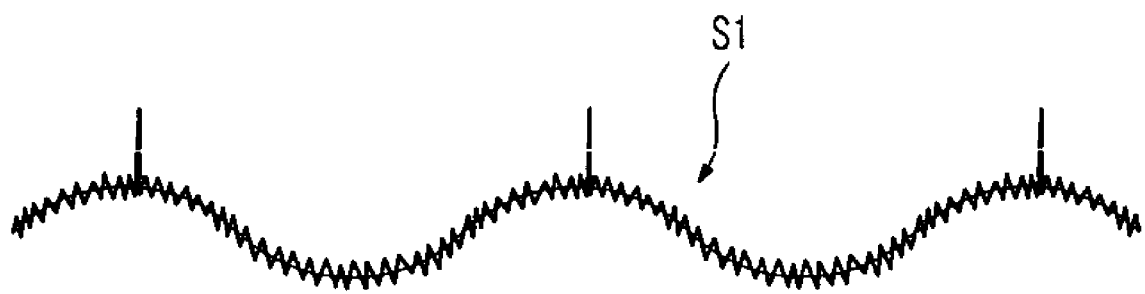
FIGS. 11A-11B illustrate a low gain wobble signal, and a high gain wobble signal respectively.
Figure 11B:
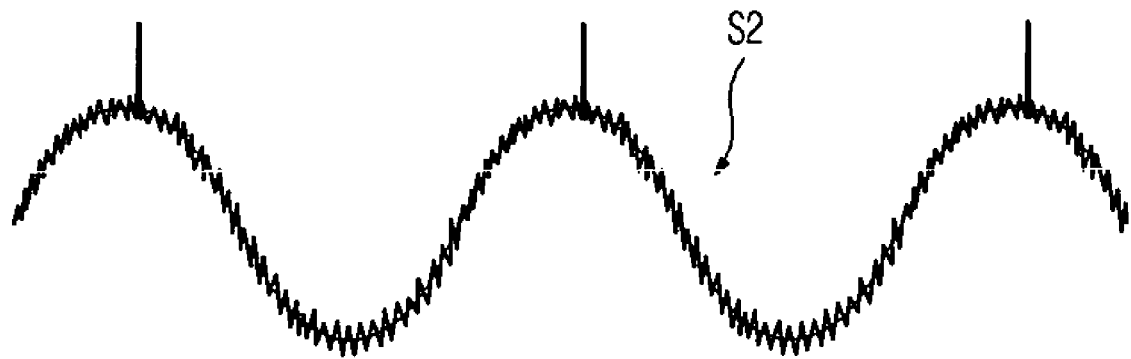

FIG. 11A is a view illustrating a low gain wobble signal, and FIG. 11B is a view illustrating a high gain wobble signal. That is, if the error test is respectively performed with respect to the push-pull signal with a small gain (S1) as shown in FIG. 11A and the push-pull signal with a large gain (S2) as shown in FIG. 11B, the results are different.

Therefore, when the zones are partitioned according to the gain of the wobble signal as well as the balance level and the slice level, and the error test is performed with respect to the representative value of the zone. As a result, it is possible to accurately detect the land pre-pit signal.

Figure 12:
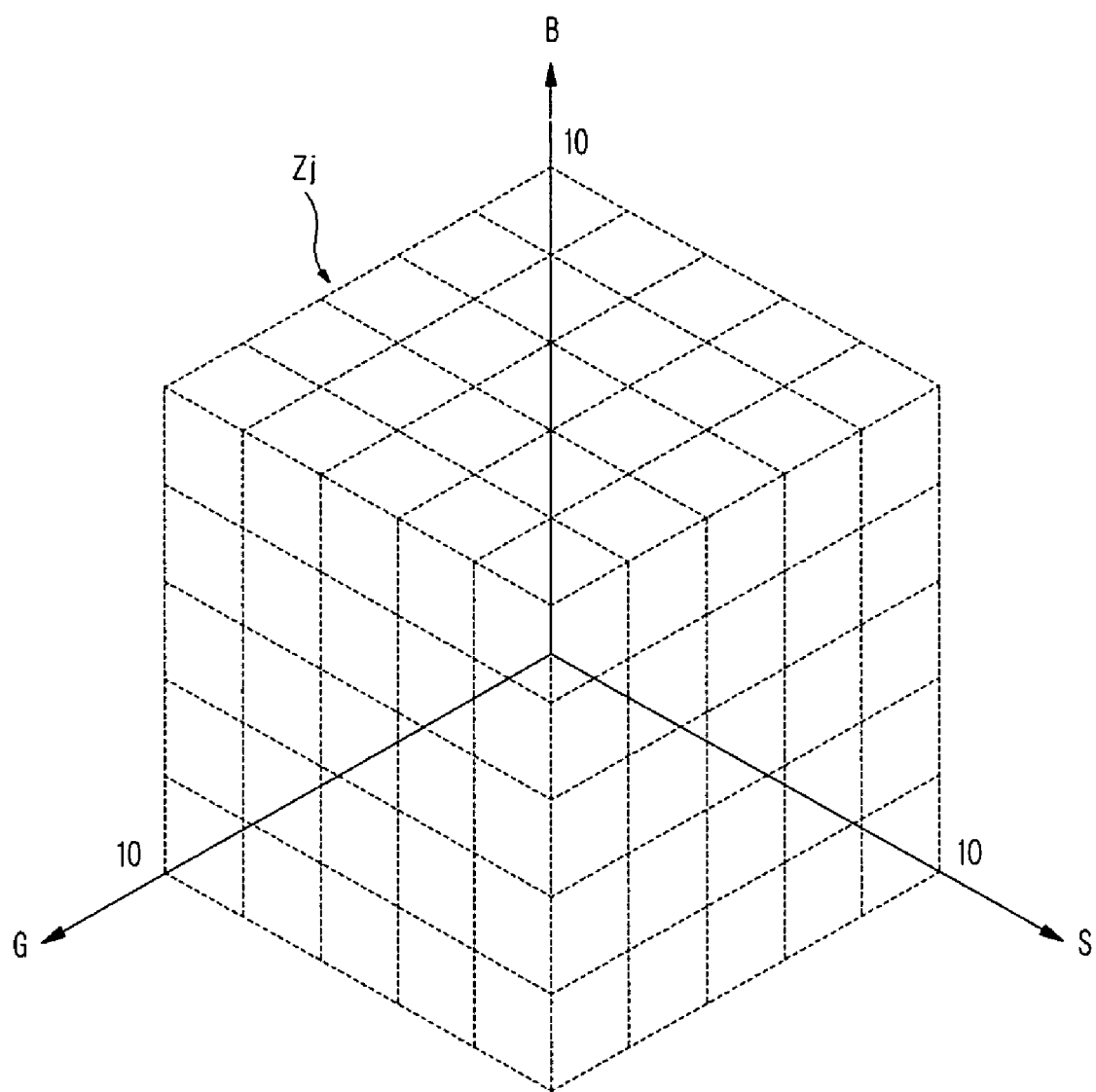
FIG. 12 illustrates an example zone table in which zones are formed on the basis of a balance level, a slice level and a gain of a wobble signal according to another embodiment of the present invention.

FIG. 12 is a view illustrating an example zone table in which zones are formed on the basis of a balance level, a slice level and a gain of a wobble signal according to another embodiment of the present invention. As shown in FIG. 12, a plurality of zones are partitioned according to three (3) determination factors, that is, the balance level, the slice level and the gain of the wobble signal. The zones are numbered in series, and the representative value is rearranged with respect to the numbered zones.

FIG. 13 is a view illustrating an example table in which representative values of zones correspond to zone number which is respectively classified to the zones shown in FIG. 12. As shown in FIG. 13, the representative value (B, S, G) corresponding to the zone number (Zj) is composed of the balance level, the slice level and the gain of the wobble signal. Herein, the configuration of the optical disc driving apparatus as shown in FIG. 3 may be referred to. In addition, the control unit 100 determines whether the land pre-pit signal is suitable on the basis of the address decoded by the LPP decoder 60, and performs the error test with respect to the land pre-pit signal.

However, in the error test with respect to the land pre-pit signal, the control unit 100 outputs the first, second and third signals (101, 102, 103) to the first, second and third registers (R1, R2, R3) of the RF processing unit (20) in order to rearrange the balance level, the slice level and the gain of the wobble signal as determination factors of the land pre-pit signal.

Figure 14:
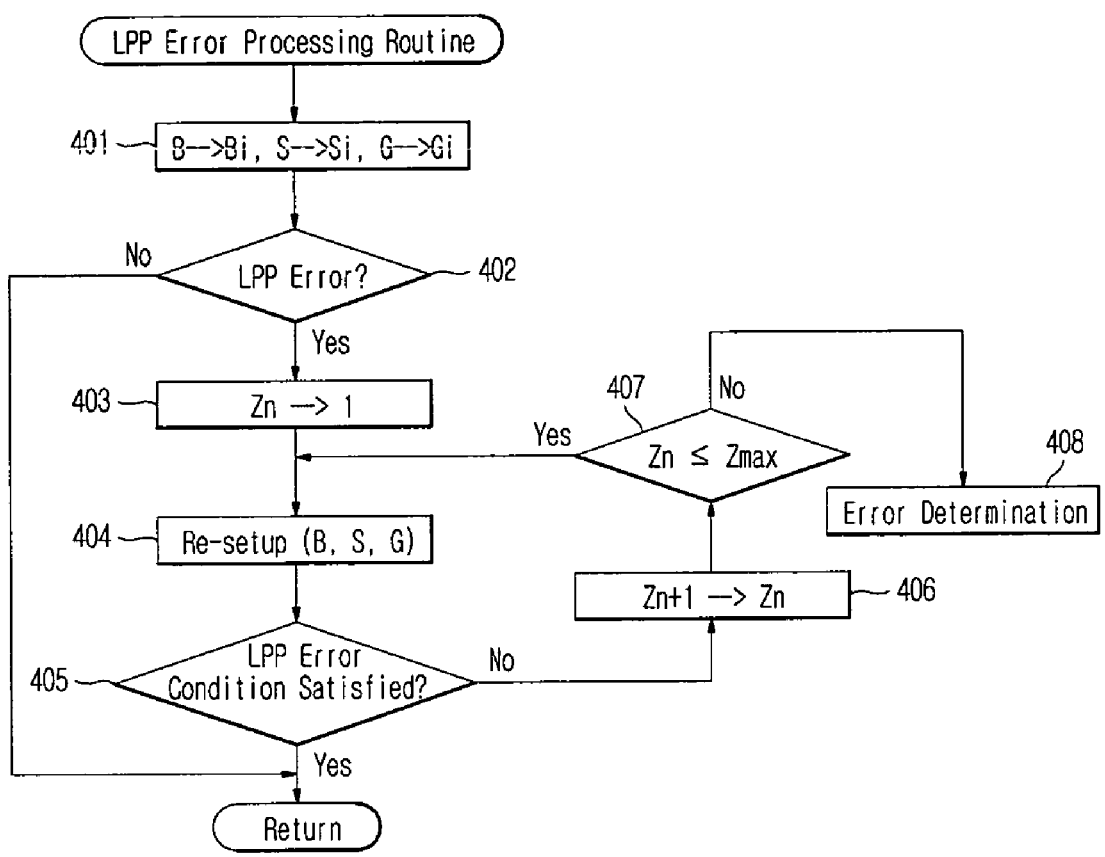
FIG. 14 is a flowchart of an error test method in which a balance level, a slice level and a gain of a wobble signal are arranged according to yet another embodiment of the present invention.

FIG. 14 is a flowchart illustrating an error test method in which a balance level, a slice level and a gain of a wobble signal are arranged according to yet another embodiment of the present invention.

Referring to FIG. 14, to begin with, a balance level (B), a slice level (S) and a gain (G) of a wobble signal are set to respective initial values (Bi, Si, Gi) at block 401. Next, whether a land pre-pit error occurs is determined by comparing a land pre-pit decoding address with a reference value at block 402. Accordingly, in the case where the land pre-pit is not adequately detected, that is, the land pre-pit error occurs, zone number (Zn) is set to 1 at block 403, and a representative value (B, S, G) in response to the first zone (Z1), that is, a pair of the balance level, the slice level and the gain of the wobble signal is rearranged to (1, 1, 0) at block 404.

The error test is performed by applying the balance level, the slice level and the gain of the wobble signal (1, 1, 0) which are rearranged according to the representative value of the first zone. Next, whether the result satisfies an error condition is determined at block 405. Herein, the test range is set to the entirety of 100 ECC blocks, and an error probability is calculated in response to the sum of errors generated in each block. If the calculated error probability is within a specific range (5~10%), it is considered that the calculated error probability satisfies the error condition.

If the resulting calculated error probability satisfies the error condition, the zone number (Zn) is incremented by 1 at block 406. Then, whether the incremented zone number (Z2) is below the last zone number (Zmax) of 125 is determined at block 407. If the zone number (Z2) is below the last zone number (Zmax), the process returns to block 404 and the balance level, the slice level and the gain of the wobble signal (1, 3, 0) is rearranged on the basis of the representative value in response to the second zone (Z2). Subsequently, the error test is performed by applying the rearranged balance level and slice level, whether the result satisfies an error condition is determined at block 405.

In this error test, the balance level and slice level according to a representative value of any zone may be arranged. If the resulting error provability satisfies the specific condition (5~10%), the land pre-pit signal can be stably detected from now on.

In addition, if the error probability does not satisfy the error condition even when the error test is performed with respect to the balance level and the slice level rearranged according to representative values of all zones, the error occurs due to physical damage of the optical disc or the like is confirmed at block 408.

As is apparent from the above description, the present invention provides an optical disc driving apparatus, wherein, by defining representative values of each zone according to the size of a balance level and a slice level, it is possible to decrease time for determining the optimal balance level and slice level, and to apply the optimal balance level and slice level to the optical disc driving apparatus in real time, and a land pre-pit detection method using the same. In addition, the present invention provides an optical disc driving apparatus, wherein, by defining representative values of each zone according to a balance level, a slice level and a gain of a wobble signal and by using representative values of each zone when testing in real-time, it is possible to increase a performance for detecting a land pre-pit, and a land pre-pit detection method using the same.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, an optical disc can be any recording medium, including DVD, DVD-R, DVD-RW, DVD+RW, DVD-RAM, DVD-ROM, CD, CD-R, CD-RW, and CD-ROM, or alternatively, any high-density medium, such as blue-ray disc (BD) and advanced optical disc (AOD). Similarly, a control unit can be implemented as a chipset having firmware, or alternatively, a general or special purposed computer programmed to perform the methods as described, for example, with reference to FIGS. 10 and 14. Accordingly, it is intended, therefore, that the present invention not be limited to the various example embodiments disclosed, but that the present invention includes all embodiments falling within the scope of the appended claims.

What is claimed is:

1. An optical disc driving apparatus comprising:
    an RF processing unit arranged to form a push-pull signal from an electrical signal acquired through an optical disc;
    a control unit configured to arrange a representative value of determination factors for forming the push-pull signal, and testing an error with respect to a land pre-pit (LPP) signal detected from the push-pull signal; and
    a zone table which stores a plurality of representative values corresponding to a plurality of zones which are respectively partitioned depending on a size of the determination factors.

2. The apparatus as claimed in claim 1, wherein the control unit rearranges the representative value of the determination factors for forming the push-pull signal, when an error test result satisfies a predetermined error condition.

3. The apparatus as claimed in claim 2, wherein the control unit determines whether the predetermined error condition is satisfied on the basis of an error probability acquired by the error test within a predetermined range.

4. The apparatus as claimed in claim 2, wherein the RF processing unit forms the push-pull signal on the basis of the representative value of the determination factors which is rearranged.

5. The apparatus as claimed in claim 1, wherein the control unit acquires the representative value of the determination factors from the zone table.

6. The apparatus as claimed in claim 1, wherein the zone table in which a plurality of zones are uniformly formed, has the same sized determination factors.

7. The apparatus as claimed in claim 1, wherein the zone table includes at least two of the determination factors, and the zone table in which a plurality of zones are formed has at least one of the determination factors and other determination factors with respective different sizes.

8. The apparatus as claimed in claim 1, wherein the zone table in which a plurality of zones are formed has partly different zone density within the entire zone range.

9. The apparatus as claimed in claim 1, wherein the determination factors include a balance level and a slice level.

10. The apparatus as claimed in claim 9, wherein the determination factors further comprise a gain of a wobble signal.

11. A land pre-pit (LPP) detection method comprising;
    forming a push-pull signal from an electrical signal acquired through an optical disc;
    detecting a land pre-pit signal from the push-pull signal;
    testing an error with respect to the land pre-pit signal;
    defining a representative value of determination factors for forming the push-pull signal, when an error test result does not satisfy a predetermined error condition; and
    testing an error with respect to the land pre-pit signal detected from the push-pull signal which is formed on the basis of the defined representative value of the determination factors;
    wherein the defining of the representative value of the determination factors is acquired in a predetermined order from a zone table in which a plurality of zones are stored.

12. The method as claimed in claim 11, wherein the defining of the representative value of the determination factors is reiterated a predetermined number of times in order to satisfy the predetermined error condition.

13. The method as claimed in claim 11, wherein the defining of the representative value of the determination factors is performed according to at least one of a balance level and a slice level.

14. The method as claimed in claim 11, wherein the defining of the representative value of the determination factors is performed according to at least one of a balance level, a slice level and a gain of a wobble signal.

15. The apparatus as claimed in claim 1,
    wherein the control unit performs error testing by:
        setting a balance level and a slice level at respective initial values;
        determining whether a land pre-pit error occurs by comparing a land pre-pit decoding address with a reference address;
        when the land pre-pit error occurs, arranging a zone number at a first zone, and rearranging a representative value indicating the balance level and the slice level in response to the first zone; and
        applying the balance level and the slice level which are rearranged according to the representative value of the first zone, and repeating the application of the balance level and the slice level which are rearranged according to representative values of all zones until an error test result satisfies an error condition.

16. The apparatus as claimed in claim 1,
    wherein the control unit performs error testing by:
    setting a balance level, a slice level and a gain of a wobble signal at respective initial values;

determining whether a land pre-pit error occurs by comparing a land pre-pit decoding address with a reference address;

when the land pre-pit error occurs, arranging a zone number at a first zone, and rearranging a representative value indicating the balance level, the slice level and the gain of the wobble signal in response to the first zone; and applying the balance level, the slice level and the gain of the wobble signal which are rearranged according to the representative value of the first zone, and repeating the application of the balance level, the slice level and the gain of the wobble signal which are rearranged according to representative values of all zones until an error test result satisfies an error condition.

17. An optical disc driving apparatus comprising:

an optical pickup arranged to irradiate a laser beam onto a surface of an optical disc and to receive a reflected laser beam from the surface of the optical disc;

an RF processing unit arranged to form a push-pull signal based an electrical signal obtained from the reflected light beam; and a control unit provided with a zone table comprising plural zones, and configured to arrange representative values of determination factors in different zones for forming the push-pull signal and to perform error testing with respect to a land pre-pit (LPP) signal detected from the push-pull signal in which the representative values of different zones are utilized until an error test result satisfied a predetermined error condition.

18. The apparatus as claimed in claim 17, wherein the control unit determines whether the predetermined error condition is satisfied on the basis of an error probability acquired by the error testing within a predetermined range.

19. The apparatus as claimed in claim 17, wherein the RF processing unit forms the push-pull signal on the basis of the representative values of the determination factors which are rearranged.

20. The apparatus as claimed in claim 17, wherein the zone table stores a plurality of representative values corresponding to a plurality of zones which are respectively partitioned depending on a size of the determination factors.

21. The apparatus as claimed in claim 17, wherein the control unit acquires the representative values of the determination factors from the zone table.

22. The apparatus as claimed in claim 17, wherein the zone table in which a plurality of zones are uniformly formed, has the same sized determination factors.

23. The apparatus as claimed in claim 17, wherein the zone table includes at least two of the determination factors, and the zone table in which a plurality of zones are formed has at least one of the determination factors and other determination factors with respective different sizes.

24. The apparatus as claimed in claim 17, wherein the zone table in which a plurality of zones are formed has partly different zone density within the entire zone range.

25. The apparatus as claimed in claim 17, wherein the determination factors include a balance level and a slice level.

26. The apparatus as claimed in claim 25, wherein the determination factors further comprise a gain of a wobble signal.

27. The apparatus as claimed in claim 17, wherein the representative values of the determination factors are acquired in a predetermined order from the zone table in which a plurality of zones are stored.

28. The apparatus as claimed in claim 17, wherein the representative values of the determination factors are defined according to at least one of a balance level, a slice level, and a gain of a wobble signal.

* * * * *